(12) United States Patent
Laub et al.

(10) Patent No.: US 8,843,403 B2
(45) Date of Patent: Sep. 23, 2014

(54) COMPUTER-IMPLEMENTED METHODS AND COMPUTER SYSTEMS FOR MANAGING AND VALUATING INVENTORY

(75) Inventors: Udo Laub, Hambruecken (DE); Ralf Kuehner, Kaiserslautern (DE); Manfred Metz, Karlsruhe (DE)

(73) Assignee: SAP AG, Walldorf (DE)

( * ) Notice: Subject to any disclaimer, the term of this patent is extended or adjusted under 35 U.S.C. 154(b) by 2421 days.

(21) Appl. No.: 10/968,025

(22) Filed: Oct. 20, 2004

(65) Prior Publication Data

US 2005/0119951 A1 Jun. 2, 2005

(30) Foreign Application Priority Data

Oct. 20, 2003 (EP) .................................... 03024159
Dec. 3, 2003 (EP) .................................... 03027686

(51) Int. Cl.
*G06F 19/00* (2011.01)
*G06Q 10/08* (2012.01)

(52) U.S. Cl.
CPC ........... *G06Q 10/087* (2013.01); *Y10S 707/949* (2013.01)
USPC .............................. 705/28; 700/115; 707/949

(58) Field of Classification Search
USPC ......................................................... 705/23
See application file for complete search history.

(56) References Cited

U.S. PATENT DOCUMENTS

| | | | |
|---|---|---|---|
| 4,633,395 A * | 12/1986 | Kuehfuss ......................... 705/28 |
| 5,249,120 A | 9/1993 | Foley | |
| 5,570,291 A | 10/1996 | Dudle et al. | |
| 5,712,789 A | 1/1998 | Radican | |
| 5,838,236 A | 11/1998 | Bentley et al. | |
| 6,345,259 B1 | 2/2002 | Sandoval | |
| 7,069,100 B2 * | 6/2006 | Monette et al. ................ 700/116 |
| 2002/0069103 A1 * | 6/2002 | Puri et al. ......................... 705/11 |
| 2003/0009396 A1 | 1/2003 | DeVries et al. | |
| 2003/0144932 A1 | 7/2003 | Martin et al. | |

FOREIGN PATENT DOCUMENTS

WO      WO 96/35187 A      11/1996

* cited by examiner

*Primary Examiner* — F. Zeender
*Assistant Examiner* — H Rojas
(74) *Attorney, Agent, or Firm* — Finnegan, Henderson, Farabow, Garrett & Dunner, L.L.P.

(57) ABSTRACT

Methods and computer systems are provided managing and valuating inventory. In one embodiment, a computer system may assign every item of goods which is entering a working process to an identifier. The computer system may then track the goods in the working process. Further, the computer system may update a given identifier when the goods assigned to this identifier enter another stage in the working process, assign at least one price to each stage in the working process, determine the content of one or more identifiers, and calculate a price for goods in the working process.

21 Claims, 4 Drawing Sheets

COMPUTER-IMPLEMENTED METHODS AND COMPUTER SYSTEMS FOR MANAGING AND VALUATING INVENTORY

BACKGROUND

1. Technical Field

Embodiments of the present invention generally relate to data processing and the technical field of managing and valuating inventory. More particularly, embodiments of the present invention relate to computer systems, computer program products and computer-implemented methods for monitoring a physical inventory throughout a working or production process to allow a manufacturer to valuate a stock of goods in the working process.

2. Background Information

Traditionally, a manufacturer uses manpower to maintain and manage inventory control of both raw materials and finished products. There already exist computer systems and computer program solutions that assist in collecting and evaluating data as to raw material kept in stock and finished or end products (or work result) kept in stock. As can be appreciated easily, existing methods are limited to any material or goods or products kept in stock, resulting in the fact that only actual quantities of stock can be considered.

However, there is always a certain quantity of unfinished goods somewhere in the working (or production) process line which are never considered when valuating the assets. Obviously, this is a drawback for economical and legal reasons as the valuation only reflects part of the whole picture as an asset or item which is taken into account in the raw material stock disappears from that stock only to reappear in the stock of finished goods, but only after a certain time. During that time, the given item is basically non-existent and does not contribute to the calculation of the overall value in the value creation chain.

SUMMARY

Consistent with embodiments of the present invention, systems and methods may be provided for managing and valuating inventory. Such systems and methods may allow for a complete registration and valuation of goods which are in the working or production process (hereinafter generally referred to as a "working process"). This may be achieved by embodiments of the invention, as disclosed and claimed herein.

In accordance with one embodiment, every item of goods which is entering a working or production process may be assigned to an identifier. The one or more identifiers may contain information which allows for a valuation. This information could be, for example, the characteristics and/or the stage of the working process in which the goods assigned to the given identifier are at that moment.

Consistent with another embodiment, the goods which are in the working process are tracked. This can be achieved, for example, by appropriate detectors. The one or more identifiers are updated when the goods assigned to an according identifier enter another stage in the working process. Updates can be effected on a regular basis or when appropriate. Consistent with principles of the present invention, at least one price may be assigned to each stage in the working process, e.g. according to the value added to the goods in the working process in the relevant stage.

Furthermore, consistent with embodiments of the invention, the content of the one or more identifiers may be determined and a price may be calculated for goods in the working process.

Embodiments consistent with the invention may allow for a sophisticated object cost control by valuating all goods and even rejects in a working process line, notwithstanding their status as raw material, unfinished product or finished product. Furthermore, embodiments consistent with the invention may allow for a physical inventory which leads to a valuation according to legal requirements in the context of balance sheet purposes.

In the context of embodiments consistent with the invention, a "product" or "item of goods" may comprise goods of industrial manufacture, as well as goods resulting from the provision of a service. Analogously, a "manufacturer" may comprise an industrial producer, as well as a service provider. It is thus easily understood that embodiments consistent with the invention apply to all kinds of working processes involving a value creation chain.

Embodiments consistent with the invention also relate to computer programs with program coding means which are suitable for carrying out methods consistent with the present invention when the computer program is run on a computer. This may be achieved by embodiments of the invention, as disclosed and claimed herein.

Further features and embodiments of the invention will become apparent from the description and the accompanying drawings.

It will be understood that the features mentioned above and those described hereinafter can be used not only in the combination specified, but also in other combinations or on their own, without departing from the scope of the present invention.

Embodiments of the invention are schematically illustrated in the drawings by means exemplary embodiments and is hereinafter explained in detail with reference to the drawings. It is understood that the description is in no way limiting on the scope of embodiments consistent with the present invention and is merely an illustration of embodiments of the invention.

Additional objects and advantages of embodiments of the invention will be set forth in part in the description which follows, and in part will be obvious from the description, or may be learned by practice of the disclosed embodiments of the invention. The objects and advantages of embodiments of the invention may be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts.

Figure 1:
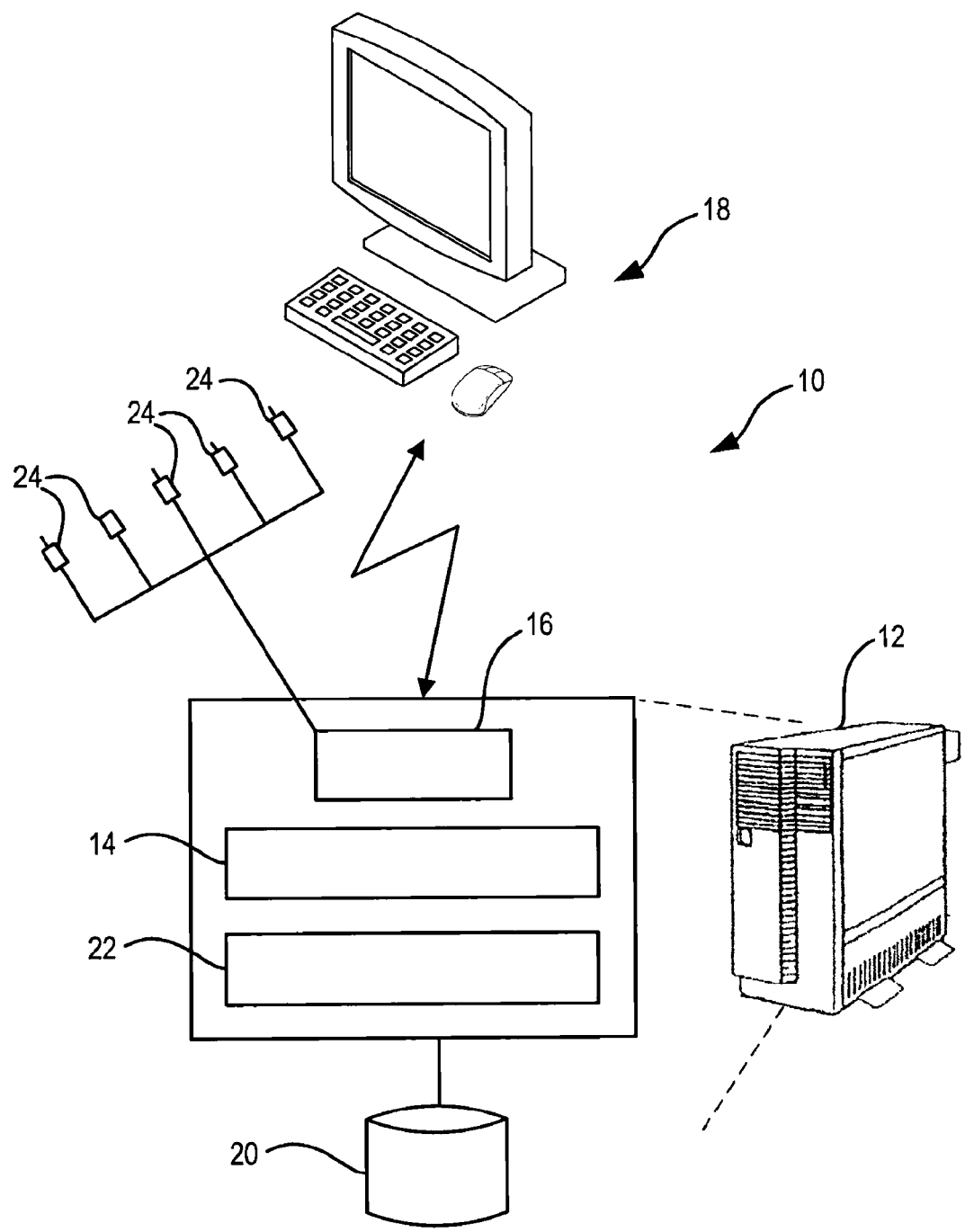
FIG. 1 is a schematic view of an exemplary computer inventory system, consistent with an embodiment of the invention.

FIG. 1 illustrates schematically a computer inventory system 10, according to an embodiment of the invention. The computer system 10 comprises a computer 12 with a bus 22 for communicating data, a processing unit 14 and an inventory database 20 for storing one or more identifiers. The computer system 10 further comprises at least one input/output device 18 which in the example of FIG. 1 may comprise a client with a keyboard, a mouse for cursor control and/or a monitor. However, there could also be provided additionally or alternatively automatic input/output devices, such as bar code readers and the like. The at least one input/output device 18 is connected with the computer within a network, such as an intranet, a local area network (LAN), etc.

As further shown in FIG. 1, the computer system 10 may also comprise a plurality of detectors 24 for tracking goods in a working process. The detectors 24 may be linked to the computer 12 via an interface 16. Conventional detectors may be used to implement detectors 24, such as bar code labels, radio-frequency (RF) identification (ID) tags or labels and the like.

Figure 2A:
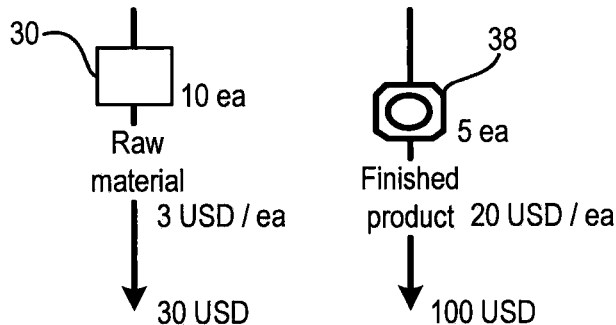
FIG. 2a is a schematic depiction of an inventory method known from the prior art.

Referring now to FIG. 2a, an embodiment of a traditional inventory in balance sheet is described. FIG. 2a shows at 30 a schematic depiction of a raw material in stock. It is assumed that there are ten pieces of raw material 30 in stock. Each of the raw material pieces 30 is worth USD 3 (USD=U.S. Dollars) resulting in a value of USD 30 for raw material on stock. Further, FIG. 2a shows at 38 a schematic depiction for a finished product on stock, wherein it is assumed that there are five pieces of finished product 38 on stock. The overall value for the finished products 38 on stock is USD 100 taking into account the price of USD 20 per piece. This results is an overall inventory value of USD 130.

Figure 2B:
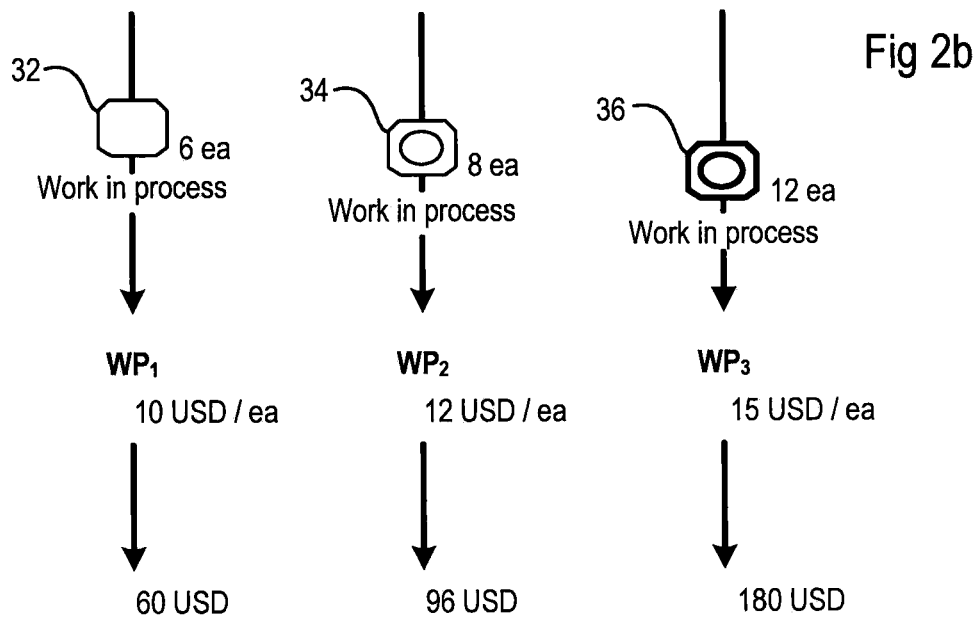
FIG. 2b is a schematic depiction of an exemplary inventory method, consistent with an embodiment of the invention.

As already pointed out above, this conventional inventory method ignores intermediate stages of goods being processed. According to an embodiment of the invention, and as illustrated in FIG. 2b, there can be several stages of a production process, each containing a plurality of unfinished products. In the embodiment shown in FIG. 2b, there are three stages referenced as WP1, WP2 and WP3 for the working process stage 1, 2 and 3. The unfinished products in each of the stages WP1, WP2 and WP3 are indicated with reference numerals 32, 34, and 36. As further illustrated in FIG. 2b, there are six pieces of unfinished products 32 in stage WP1, eight pieces of unfinished products 34 in stage WP2 and twelve pieces of unfinished products 36 in stage WP3.

According to embodiments of the invention, each stage may be assigned a price for the unfinished product of that stage, i.e. a price is assigned to every unfinished product taking into consideration its stage and the value added through the production process until the given stage. In the embodiment described herein, the price assigned to the first stage WP1 is USD 10, the price assigned to the second stage WP2 is USD 12 and the price assigned to the third stage is USD 15. This results in an overall value for unfinished products in all three stages of USD 60+USD 96+USD 180=USD 336, a value which was neglected hitherto with traditional inventory systems and methods.

According to embodiments of the invention, an identifier may be stored in database 20 and unfinished goods are assigned to an identifier. Each identifier can contain information as to the characteristics and/or the production stage of each assigned item of goods as well as the quantity. Every time a product or item of goods enters another stage being detected via detectors 24, the identifier may be updated accordingly, with the update stored in database 20. The tracking of products may be performed by means of detectors 24 and may result in a number of products contained in a given stage of the production or working process. However, it is to be understood that it is also possible to input the number of products in a given stage manually. According to a further embodiment, the invention also provides for a manual or automatic correction of the values generated by stage detectors, the correction possibly being based on manual counting or on data provided by a logistics system.

The calculation of the inventory value on the basis of the identifiers can be effected continuously or periodically. Preferably, the frequency of periodic calculations can be set through input/output device 18. The frequency can be, for example, oriented at the fiscal year, (interim) balance sheet closing or key dates, etc. In the following, items in the working process will be called Work in Progress (WIP) items (or as a synonym Work in Process items). In the continuous procedure, WIP items are counted continuously during the entire fiscal year whereas in the periodic procedure all WIP items in the production process are physically counted on the balance sheet key date in which case every item has to be counted.

The lengths of the intervals can also be driven by the nature of the goods and/or the time of a production cycle. In such a cycle counting inventory, unfinished goods are counted at regular intervals within a fiscal year. These intervals or cycles depend on the cycle counting indicator set through 18 for the item materials which allows fast-moving items to be counted more frequently than slow-moving items. This allows for an even more sophisticated valuation.

In a further possible approach under embodiments of the invention called inventory sampling, selected WIP items are physically counted on the balance sheet key date. If the variances between the result of the count and the book inventory balance are small enough, it is presumed that the book inventory balances for the other WIP items are correct.

According to another embodiment of the invention, more than one price can be assigned to the quantity of products located in a given stage of process. This can be done automatically on the basis of differing calculation methods. Further or alternatively, the price or prices assigned to a stage in the working process can be changed manually. This allows any products in the working process or any rejects to be evaluated simultaneously according to different valuation rules (e.g., valuation according to US-GMP, IAS, HGB (German Commercial Code), etc.). The result is a balance inventory which allows interpretation of the overall inventory in response to different needs. It also may allow for manual correction in case of unforeseen or short-term changes.

Figure 3:
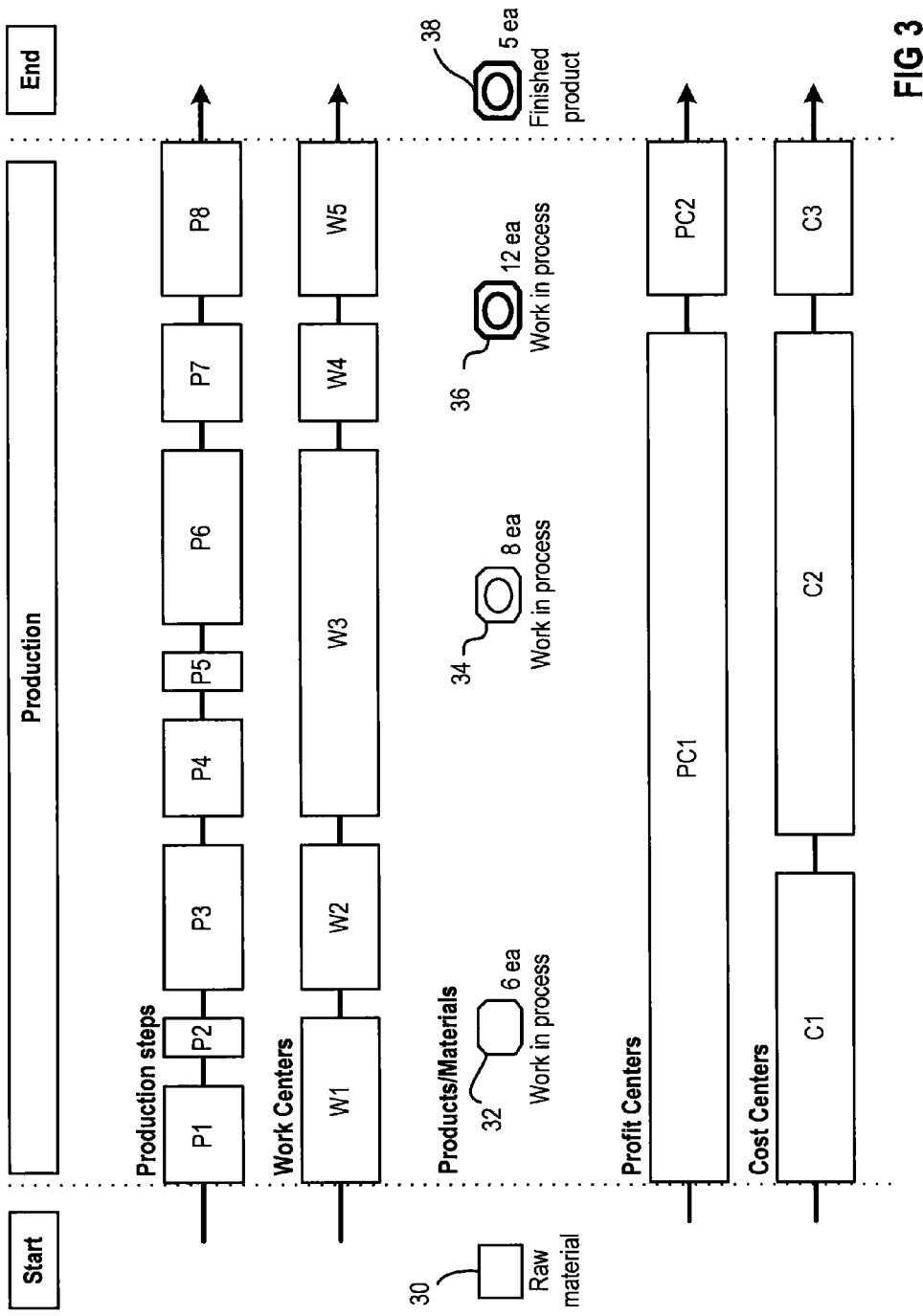
FIGS. 3 and 4 are more detailed exemplary schematic illustrations of an embodiment of an inventory method, consistent with principles of the present invention.
Figure 4:
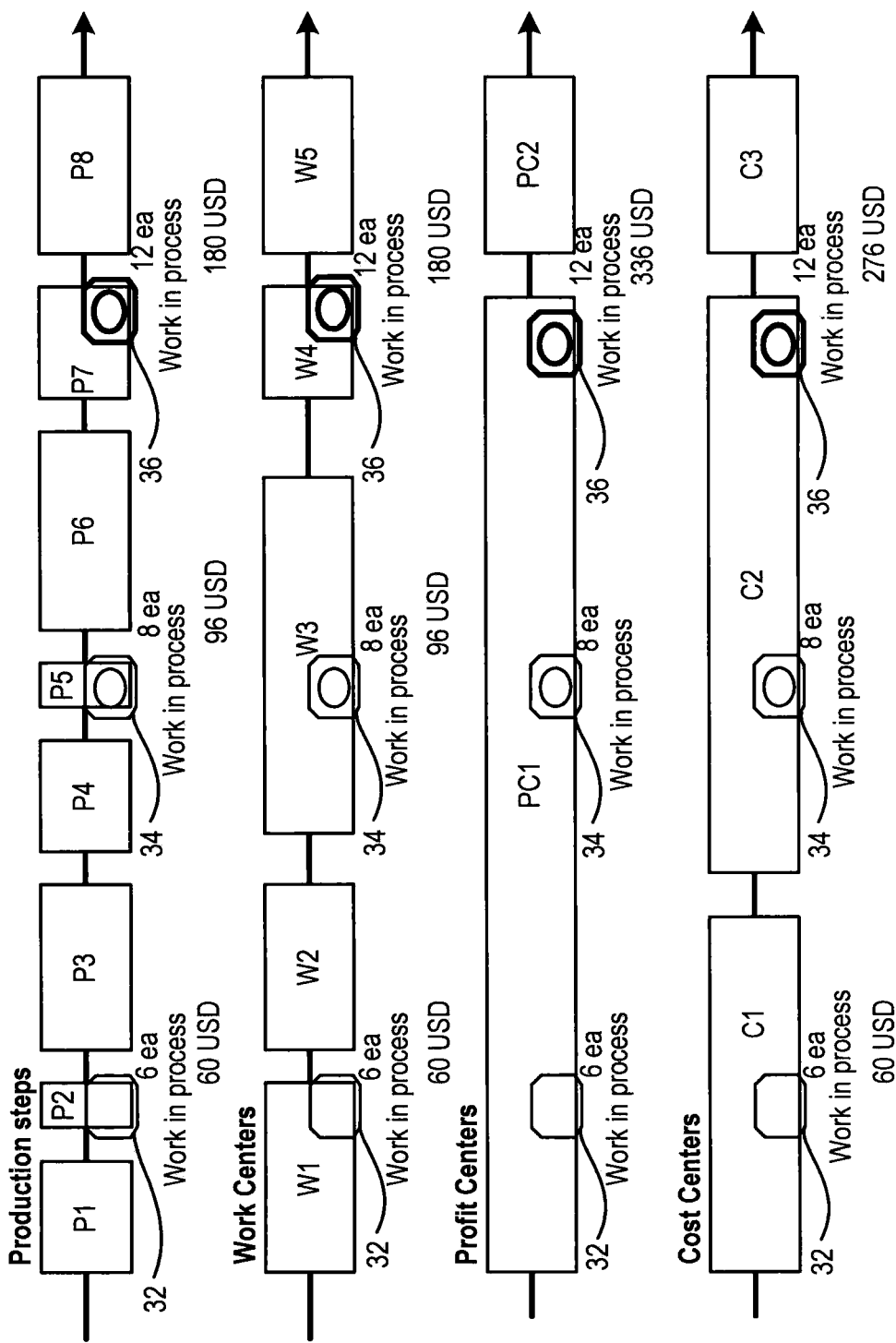

Referring now to FIGS. 3 and 4, exemplary embodiments of the invention are described in still more detail.

FIG. 3 shows by way of example, a schematic illustration of a production process, the start of the production being on the left hand side of FIG. 3 and the end of the production resulting in a finished product being on the right hand side. In between, there is a multitude of various production steps P1 to P8. However, a production or manufacturing line is not only constituted by production steps which can be defined by various pieces of equipment along the line but also by other structures which are due to the organizational environment. This is illustrated in FIG. 3 by work centers W1 to W5, by profit centers PC1 and PC2 as well as cost centers C1 to C3. Thus, there are several levels of inventory relevant groupings as it is of interest to relate inventory not only to the complete company but also internally to stages that are located within a given center.

With embodiments of the invention, it becomes thus possible, as shown in FIG. 4, to relate inventory valuation to sections of the company which are defined by center structures as exemplified above.

In the illustration of FIGS. 3 and 4, it is assumed that the goods enter the production or working process on the left hand side of the illustration. There are ten pieces of raw material 30, then there are six pieces of WIP item 32, eight pieces of WIP item 34, twelve pieces of WIP item 36 and five pieces of finished products 38, the unfinished products 32, 34, and 36 being distributed along the line.

FIG. 4 shows the location of the unfinished products in the respective organizational levels. WIP items 32 are located in production stage P2, in work center W1, in profit center PC1 and in cost center C1, WIP items 34 are located in production stage P5, in work center W3, in profit center PC1 and in cost center C2, and WIP items 36 are located in production stage P7, in work center W4, in profit center PC1 and in cost center C2. As can be seen, no items are located in production steps P1, P3, P4, P6 and P8, nor in work centers W2 and W5, nor in profit center PC2 and nor in cost center C3.

This results in an inventory valuation broken down per organizational level as follows: obviously, there is no inventory value contained in the structures with no WIP items, i.e. in production steps P1, P3, P4, P6 and P8, nor in work centers W2 and W5, nor in profit center PC2 and nor in cost center C3. However, there is inventory value contained in the production stages or steps P2 (USD 60), P5 (USD 96) and P7 (USD 180), in the work centers W1 (USD 60), W3 (USD 96) and W4 (USD 180) as well as in the profit center PC1 which contains all unfinished items with a value of USD 336, and in two of the three cost centers, C1 (USD 60) and C2 (USD 276).

Embodiments of the invention thus allow for the calculation or valuation of unfinished goods for a predeterminable number of stages of the working process, e.g. according to the structure of organizational levels, and thus for a detailed balance sheet for every organizational structure involved in the production process of a company. This in turn opens the possibility of precise internal controlling mechanisms.

Inventories should be measured at the lower of cost and net realizable value. The net realizable value is the selling price less the cost to complete the inventory and sell it. Cost includes all costs to bring the inventories to their present condition and location. If specific cost is not determinable, the benchmark treatment is to use either the first in, first out (FIFO) or weighted average cost formulas. An allowed alternative is the last in, first out (LIFO) cost formula. When LIFO is used, there should be disclosure of the lower of (i) net realizable value and (ii) FIFO, weighted average or current cost. The cost of inventory is recognized as an expense in the period in which the related revenue is recognized. If inventory is written down to net realizable value, the write-down is charged to expense. Any reversal of such a write-down in a later period is credited to income by reducing that periods cost of goods sold.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for managing and valuating inventory using an inventory database including an inventory balance indicating a quantity of goods, the method comprising:

assigning, by a processor, upon entering a first stage of a multistage working process, one or more items of goods to one or more identifiers, wherein the one or more identifiers are stored in the inventory database;

tracking, by the processor, the one or more items of goods in the working process;

setting, by the processor, a cycle count indicator for tracking the one or more items of goods;

periodically counting, by the processor, a first item of goods among the one or more items of goods based on a first frequency associated with the cycle count indicator, the first frequency being set based on a pace with which the first item of goods passes through the working process;

periodically counting, by the processor, a second item of goods among the one or more items of goods based on a second frequency associated with the cycle count indicator, the second frequency being set based on a pace with which the second item of goods passes through the working process, wherein the second item of goods moves through the working process at a faster pace than the first item of goods and the second frequency is greater than the first frequency;

balancing, by the processor, the inventory based on the periodic counting of the first item of goods and the second item of goods;

updating, by the processor, the one or more identifiers when the one or more items of goods enter a second stage of the multistage working process;

determining, by the processor, whether one of the one or more items of goods in the second stage is a rejected item of goods or an accepted item of goods;

selecting, by the processor, one or more valuation rules from a plurality of valuation rules based on the determination;

assigning, by the processor, a price per good to the one of the one or more items of goods in the second stage based on the selected one or more valuation rules and the updated one or more identifiers, wherein assigning the at least one price per good includes:

assigning, by the processor, a rejected price based on a first selected valuation rule when the one of the one or more items of goods is determined to be a rejected item of goods; and assigning, by the processor, an accepted price based on a second selected valuation rule when the one of the one or more items of goods is determined to be an accepted item of goods;

calculating, by the processor, a price for the one or more items of goods in the second stage based on multiplying a number of the one or more items of goods in the second stage and the assigned price per good in the second stage;

calculating, by the processor, a price for the one or more items of goods in the working process;

extracting, by the processor, a sample of data from the inventory balance to generate a verification result by comparing the sample of data with a received number indicating a physical count of selected goods in the working process;

accepting, by the processor, the quantity of goods indicated in the inventory balance to be accurate when the verification result is less than or equal to a threshold.

2. A method according to claim 1, wherein the one or more identifiers indicate the quantity of goods assigned to the one or more identifiers.

3. A method according to claim 1, wherein the one or more identifiers indicate the current stage of the one or more items of goods.

4. A method according to claim 3, wherein more than one price per stage is assigned to the goods in one of the multiple stages.

5. A method according to claim 1, wherein the price for goods in the working process is calculated by adding the prices calculated for all stages of the working process.

6. A method according to claim 1, wherein a price is calculated for a predeterminable number of stages of the working process.

7. A method according to claim 1, wherein the one or more identifiers are updated continuously.

8. A method according to claim 1, wherein one or more identifiers are updated periodically.

9. A method according to claim 8, wherein a cycle for the periodic tracking is selectable independently for various goods.

10. A method according to claim 1, further comprising assigning at least one price per good in the first stage.

11. A method according to claim 1, wherein the one or more identifiers indicate a characteristic of the one or more items of good.

12. A method according to claim 1, wherein the one or more identifiers indicate a number of goods in the same stage of the working process.

13. A method according to claim 1, wherein the inventory is valued at the lower of cost and net realizable value.

14. A computer inventory system for managing and valuating inventory, comprising:
   an inventory database for storing one or more identifiers and an inventory balance indicating a quantity of one or more items of goods;
   detectors for tracking goods in a working process, the one or more items of goods assigned to one of the one or more identifiers upon entering the working process;
   at least one input/output device for updating the one of the one or more identifiers assigned to the one or more items of goods when the one or more items of goods move from a first stage to a second stage in the working process; and
   a processing unit configured for:
      setting a cycle count indicator for tracking the one or more items of goods;
      periodically counting a first item of goods among the one or more items of goods based on a first frequency associated with the cycle count indicator, the first frequency being set based on a pace with which the first item of goods passes through the working process;
      periodically counting a second item of goods among the one or more items of goods based on a second frequency associated with the cycle count indicator, the second frequency being set based on a pace with which the second item of goods passes through the working process, wherein the second item of goods moves through the working process at a faster pace than the first item of goods and the second frequency is greater than the first frequency;
      balancing the inventory based on the periodic counting of the first item of goods and the second item of goods;
      retrieving data stored in inventory database;
      updating the one or more identifiers when the one or more items of goods enter a second stage of the multistage working process;
      determining whether one of the one or more items of goods in the second stage is a rejected item of goods or an accepted item of goods;
      selecting one or more valuation rules from a plurality of valuation rules based on the determination;
      assigning a price per good to the one of the one or more items of goods in the second stage based on the selected one or more valuation rules and the updated one or more identifiers, wherein assigning the at least one price per good includes:
         assigning a rejected price based on a first selected valuation rule when the one of the one or more items of goods is determined to be a rejected item of goods; and
         assigning an accepted price based on a second selected valuation rule to the one of the one or more items of goods when the one of the one or more items of goods is determined to be an accepted item of goods;
      calculating a price for the one or more items of goods in the second stage based on multiplying a number of the one or more items of goods in the second stage and the assigned price per good in the second stage;
      calculating a price for the one or more items of goods in the working process;
      extracting a sample of data from the inventory balance to generate a verification result by comparing the sample of data with a received number indicating a physical count of selected goods in the working process; and
      accepting the quantity of goods indicated in the inventory balance to be accurate when the verification result is less than or equal to a threshold.

15. A computer inventory system according to claim 14, wherein the one or more identifiers indicate the quantity of goods assigned to each of the identifiers.

16. A computer inventory system according to claim 14, wherein the one or more identifiers assigned to the goods indicate the current stage of the goods.

17. A computer inventory system according to claim 14, wherein the processing unit calculates the price for goods in the working process by adding the prices calculated for all stages of the working process.

18. A computer inventory system according to claim 14, wherein the processing unit calculates a price for a predeterminable number of stages of the working process.

19. A computer inventory system according to claim 14, wherein the processing unit retrieves identifier data stored in the inventory database continuously.

20. A computer inventory system according to claim 14, wherein the processing unit retrieves identifier data stored in the inventory database periodically.

21. A non-transitory computer-readable medium with a computer program stored thereon, the computer program comprising program coding means which are suitable for carrying out a method for managing and valuating inventory when the computer program is run on a computer, the method comprising:
   storing, in an inventory database, an inventory balance indicating a quantity of one or more items of goods;
   assigning, upon entering a first stage of a multistage working process, the one or more items of goods to one or more identifiers;
   tracking the one or more items of goods in the working process;
   setting a cycle count indicator for tracking the one or more items of goods;

periodically counting a first item of goods among the one or more items of goods based on a first frequency associated with the cycle count indicator, the first frequency being set based on a pace with which the first item of goods passes through the working process;
periodically counting a second item of goods among the one or more items of goods based on a second frequency associated with the cycle count indicator, the second frequency being set based on a pace with which the second item of goods passes through the working process, wherein the second item of goods moves through the working process at a faster pace than the first item of goods and the second frequency is greater than the first frequency;
balancing the inventory based on the periodic counting of the first item of goods and the second item of goods;
updating the one or more identifiers when the one or more items of goods enter a second stage of the multistage working process;
determining whether one of the one or more items of goods in the second stage is a rejected item of goods or an accepted item of goods;
selecting one or more valuation rules from a plurality of valuation rules based on the determination;
assigning a price per good to the one of the one or more items of goods in the second stage based on the selected one or more valuation rules and the updated one or more identifiers, wherein assigning the at least one price per good includes:
assigning a rejected price based on a first selected valuation rule when the one of the one or more items of goods is determined to be a rejected item of goods; and
assigning an accepted price based on a second selected valuation rule when the one of the one or more items of goods is determined to be an accepted item of goods;
calculating a price for the one or more items of goods in the second stage based on multiplying a number of the one or more items of goods in the second stage and the assigned price per good in the second stage;
calculating a price for the one or more items of goods in the working process;
extracting a sample of data from the inventory balance to generate a verification result by comparing the sample of data with a received number indicating a physical count of selected goods in the working process; and
accepting the quantity of goods indicated in the inventory balance to be accurate when the verification result is less than or equal to a threshold.

* * * * *